(12) United States Patent
Pouettre et al.

(10) Patent No.: US 6,568,082 B2
(45) Date of Patent: May 27, 2003

(54) RAZOR HEAD WITH AN ANTI-FRICTION ELEMENT HAVING A SOLE FIXED TO THE RAZOR HEAD BY WELDING

(75) Inventors: Michaël Pouettre, Blonville sur Mer (FR); Didier Lange, Saint-Leonard (FR)

(73) Assignee: Societe Bic (FR)

( * ) Notice: Subject to any disclaimer, the term of this patent is extended or adjusted under 35 U.S.C. 154(b) by 0 days.

(21) Appl. No.: 09/987,000

(22) Filed: Nov. 13, 2001

(65) Prior Publication Data

US 2002/0144403 A1 Oct. 10, 2002

Related U.S. Application Data

(63) Continuation of application No. PCT/FR00/01243, filed on May 9, 2000.

(51) Int. Cl.[7] .................................. B26B 21/06
(52) U.S. Cl. .................. 30/41; 30/50; 424/73
(58) Field of Search ........................ 30/41, 50; 424/73

(56) References Cited

U.S. PATENT DOCUMENTS

| | | | |
|---|---|---|---|
| 4,170,821 A | 10/1979 | Booth ........................... | 30/41 |
| 4,182,582 A | 1/1980 | Youval et al. ................. | 405/45 |
| 4,624,051 A | 11/1986 | Apprille, Jr. et al. ........... | 30/50 |
| 4,872,263 A | 10/1989 | Etheridge, III ................. | 30/41 |
| 4,875,287 A | 10/1989 | Creasy et al. ................. | 30/34.01 |
| 4,963,351 A | * 10/1990 | Weston ........................ | 424/73 |
| 5,056,221 A | * 10/1991 | Thoene ........................ | 30/41 |
| 5,095,620 A | * 3/1992 | Althaus ........................ | 30/41 |
| 5,113,585 A | 5/1992 | Rogers et al. ................. | 30/41 |
| 5,134,775 A | * 8/1992 | Althaus et al. ................. | 30/41 |
| 5,313,706 A | * 5/1994 | Motta et al. ................... | 30/50 |
| 5,603,161 A | 2/1997 | Welsh ........................ | 30/41.7 |
| 5,711,076 A | * 1/1998 | Yin et al. ...................... | 30/41 |
| D401,014 S | 11/1998 | Tseng et al. .................. | D28/47 |
| 5,956,848 A | 9/1999 | Tseng et al. .................. | 30/41 |
| 5,956,849 A | 9/1999 | Chadwick et al. ............. | 30/41 |
| 6,115,902 A | 9/2000 | Garland et al. ................ | 29/417 |
| 6,295,733 B1 | 10/2001 | Wexler et al. ................. | 30/41 |
| 6,298,558 B1 | * 10/2001 | Tseng et al. .................. | 30/41 |

FOREIGN PATENT DOCUMENTS

| | | |
|---|---|---|
| CA | 85238 | 11/1998 |
| EP | 0772511 | 5/1997 |
| FR | 2769535 | 4/1999 |

\* cited by examiner

*Primary Examiner*—Hwei-Siu Payer
(74) *Attorney, Agent, or Firm*—Pennie & Edmonds LLP

(57) ABSTRACT

A razor head is provided with an anti-friction element firmly secured to the razor head. The anti-friction element is formed of a sole and an upper layer. At least the upper layer contains a water-soluble polymer. The upper layer is secured to the sole such as by bonding, molding, coextrusion, overmolding, or twin-shot injection molding. The sole then is secured to the razor head by welding.

14 Claims, 1 Drawing Sheet

RAZOR HEAD WITH AN ANTI-FRICTION ELEMENT HAVING A SOLE FIXED TO THE RAZOR HEAD BY WELDING

CROSS-REFERENCE TO RELATED APPLICATIONS

This application is a continuation of PCT Application No. PCT/FR00/01243, filed May 9, 2000.

FIELD OF THE INVENTION

The subject of the present invention is a razor head having an anti-friction element affixed thereto by welding. More particularly, the present invention relates to an improved manner of affixing an anti-friction element to a razor head.

BACKGROUND OF THE INVENTION

Numerous razors comprising an anti-friction element or strip, also known as a lubricating strip or auxiliary shaving strip, already exist. The anti-friction element may contain a polymer or a blend of polymers, one of the components of which has lubricating or cosmetic properties and is water-soluble. Thus, upon each pass with the razor, a film of cosmetic product or lubricant is applied to the user's skin, to make shaving easier and/or more comfortable.

Such razors have been described, for example, in patents FR 2 410 541 (corresponding to U.S. Pat. No. 4,170,821 to Booth), EP 0 550 605 (corresponding to U.S. Pat. No. 5,113,585 to Rogers et al.), and EP 0 184 440 (corresponding to U.S. Pat. No. 4,624,051 to Apprille, Jr. et al).

A distinction can be drawn between several groups of lubricating strips which are classified, for example, according to their shape or according to their formulation. Thus, lubricating strips may have a simple structure, that is to say a flat shape, fixed to the razor head, or alternatively may have a complex special-purpose shape which collaborates with the shape of the head in order to provide attachment by nesting or clipping in. There are also a great many formulations for these lubricating strips, which can be produced from a blend of polymer materials or can comprise various superposed layers of polymer(s), this in particular being so as to act as wear indicators, as described, for example, in GILLETTE patent EP 0 772 511 and in WARNER-LAMBERT patent EP 0 773 855 (corresponding to U.S. Pat. No. 6,295,733 to Wexler et al.).

In general, in the case of flat lubricating strips, attachment is by bonding. At the current time, there are three broad families of adhesive available commercially:

- adhesives known as "cyano" adhesives, which entail a bonding (and therefore razor manufacturing) process which is slow, because of the lack of tack at the outset, and which also have other disadvantages given that the cyano adhesive penetrates the lubricating strip where it may interact with the constituents, and that it is not very water-resistant;
- adhesives of the hot-melt type, which for their part exhibit immediate tack, but make a connection between the lubricating strip and the razor head via a flexible mat, the thickness of which is difficult to reproduce and which may easily be torn off;
- thermally activated adhesives which entail a bonding (and therefore razor manufacturing) method which is slow.

Furthermore, the adhesive-bonding attachment methods employ adhesive compositions which come in liquid form of some viscosity. The use of such products is a source of problems in manufacturing methods that operate at a very high rate, such as those used for the industrial-scale manufacture of razors.

It was therefore desirable, in order to alleviate these drawbacks, to find a means of attaching a lubricating strip to the head of a razor which did not lead to modifications to the properties of the lubricating strip, which was easy and quick to use on an industrial scale, and which afforded a very strong connection between the razor head and the lubricating strip.

The use of a lubricating strip consisting of a blend of insoluble polymer and of soluble polymer, which strip was fixed to the shaving head by ultrasonic welding, is described in French application FR 2 769 535 (corresponding to Australian Patent 738251). However, it is desirable to attach a lubricating strip in a manner which is easier to implement and results in reliably high quality.

SUMMARY OF THE INVENTION

In accordance with the principles of the inventors, a highly effective lubricating strip and a good speed and ease of attachment of the lubricating strip to the shaving head is obtained through the use of a special fixing means which does not entail the use of an adhesive.

The subject of the present invention is therefore a razor head comprising an anti-friction element arranged near the blades and containing water-soluble agents, the anti-friction element has a layer containing the anti-friction material secured to a sole containing one or more insoluble polymers. The sole is fixed to the razor head by welding.

BRIEF DESCRIPTION OF THE DRAWINGS

The detailed description will be better understood in conjunction with the accompanying drawings, wherein like reference characters represent like elements, as follows:

FIG. 1b depicts a cross-sectional view along line A–A' of FIG. 1a;

FIG. 2b depicts a cross-sectional view along line B–B' of FIG. 2a; and

DETAILED DESCRIPTION OF THE INVENTION

Figure 1A:
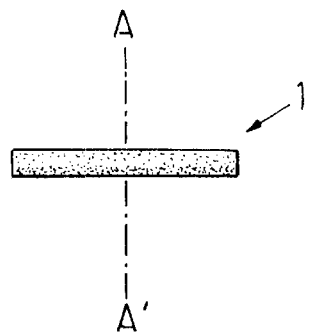
FIG. 1a depicts a plan view of a lubricating strip secured to a sole according to a first embodiment of the invention.

In a conventional way, razor heads are made of insoluble thermoplastic polymer(s) which is or are easy to work and is or are inexpensive. Such polymers are chosen, in particular, from the group comprising polyethers such as polyphenylene-ether marketed under the trade name Noryl®, styrene resins such as polystyrene, ABS, polyolefin resins such as polypropylene and polyethylene, acrylic resins such as PMMA, and vinyl resins such as plasticized or non-plasticized polyvinyl chloride, or blends thereof. As a preference, the shaving heads are made of polystyrene.

In accordance with the principles of the present invention, a razor head with at least one blade is provided with an anti-friction element arranged near the at least one blade. The anti-friction element has an upper layer and a sole, as will now be described in further detail.

The sole may be made of a polymer or of a blend of polymers that can be welded to the razor head. The polymer may be chosen, in particular, from the group comprising polystyrene, polypropylene, polyvinyl chloride, or a blend thereof. Preferably the sole contains at least one water-insoluble polymer.

According to an advantageous embodiment of the razor head according to the invention, the sole material is the same nature or composition as the razor head to which it is fixed.

As a preference, the sole is made of polystyrene.

The upper layer intended to come into contact with the skin during shaving contains a polymer which is not water-soluble, blended with at least one water-soluble polymer and possibly some additives such as colorants, pigments, perfumes, cosmetic products, or products offering pharmacological properties such as, in particular, healing agents, softening agents, and refreshing agents.

By way of examples of water-soluble polymers, mention may be made of polyoxyethylenes, polyacrylamides, and polysaccharides. Thus, a layer of anti-friction material may be made up of a blend of polystyrene and of polyoxyethylenes exhibiting various molecular masses.

Highly advantageously, the anti-friction element is fixed to the razor head via the sole by ultrasonic welding.

This method entails no addition of auxiliary products and may easily be incorporated into a manufacturing line with a very high throughput without reducing the speed of the production line and without altering the chemical nature of the upper layer that is intended to come into contact with the skin.

According to a preferred embodiment, the sole is secured to the upper layer intended to come into contact with the skin during shaving by bonding, molding, coextrusion, overmolding, or twin-shot injection molding, and preferably by coextrusion.

The coextrusion method is carried out at a die head temperature suited to the thermoplastics technique, preferably from 120° C. to 300° C., and more preferably still from 150° C. to 220° C.

When the anti-friction element is not linear in shape, it is preferable to use, in particular, a twin-shot injection molding or an over molding method.

Of course, intermediate polymer layers may be arranged between the sole and the upper layer that is intended to come into contact with the skin during shaving. Such intermediate layers may be soluble or insoluble and may contain additives chosen from the group comprising, in particular, colorants, pigments, softeners, perfumes, vitamins, and cosmetic products.

If there is incompatibility between the materials of which the sole, on the one hand, and the upper strip intended to come into contact with the skin during shaving, on the other hand, are made, a third blend of polymers may be inserted and act as an interface between the two layers in order to connect them.

The thickness of the sole is from 0.05 mm to 0.6 mm, preferably from 0.05 mm to 0.4 mm, and more preferably still about 0.3 mm.

The thickness of the layer containing the water-soluble polymer(s) is from 0.1 mm to 1.5 mm, preferably from 0.3 mm to 1 mm.

The upper layer intended to come into contact with the skin during shaving may be of a completely flat shape, or alternatively may have a semicircular cross-section so as to obtain gentle contact with the skin.

The thickness of the upper layer coming into contact with the skin is such that it has a sufficient amount of water-soluble polymers needed for the anti-friction element to be effective for as long as the razor blade(s) remain sharp.

According to a particularly advantageous embodiment of the razor head according to the invention, the anti-friction element has a layer (typically the upper layer) of a blend containing from 20% to 60% of an insoluble thermoplastic polymer, preferably polystyrene, and from 20% to 80% of polyoxyethylene with a molecular mass of between 100,000 and 6,000,000, which is coextruded with a layer of polystyrene constituting the sole, the sole being ultrasonically welded to the razor head. The anti-friction element may also contain from 1% to 20% of polyoxyethylene with a molecular mass of below 30,000.

Figure 1B:
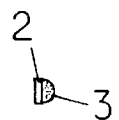

FIG. 1a depicts a plan view of an anti-friction element 1 according to the invention. As illustrated in FIG. 1b, anti-friction element 1 comprises a sole 2 and an upper layer 3 which comes into contact with the skin. In FIG. 1b, upper layer 3 has a semicircular cross-section.

Figure 2A:
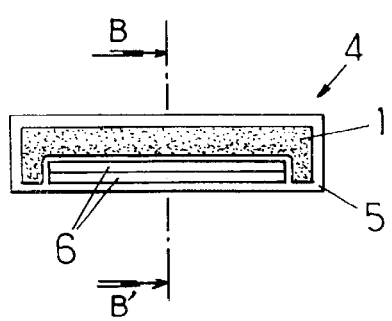
FIG. 2a depicts a plan view of a razor head according to a second embodiment of the invention.

According to another embodiment of the razor head according to the invention, depicted in FIG. 2, the razor head comprises a cap 5 to which is welded an anti-friction element 1 which is not linear but at each of its two ends has a lateral projection so that the blades 6 are arranged in front of the anti-friction element 1 in the space lying between the two lateral projections.

Figure 2B:
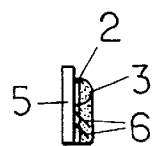

As in the previous embodiment, the anti-friction strip has a sole 2, coupled to cap 5, and an upper layer 3 in contact with the skin. In FIG. 2b, upper layer 3 has a semicircular cross-section (FIG. 2b).

The present invention will be described in greater detail with some examples which are given purely by way of illustration.

EXAMPLES

Example 1

An anti-friction strip secured to a sole, as depicted in FIG. 1, is prepared by the coextrusion of polystyrene (S) and of a compound (C) which is a blend containing, for 100 g:

30 g of polystyrene and about 70 g of polyoxyethylene with a molecular mass in excess of 5,000,000, marketed under the name PEG 115M.

(S) and (C) are introduced into two separate extruders of the single screw type having an extrusion head, allowing the superposition of layers of material, at a temperature of 180 to 200° C. The outputs of the extruders are fixed so that the height of the upper strip will be 0.5 mm, and the height of the sole, that is to say of the layer (S), will be 0.3 mm. The width of the strip is 3.5 mm. The extrusion die makes it possible to obtain an upper layer (C) of slightly domed shape so that during final use there is gentle contact with the skin. The strip obtained is then cut into pieces 35 mm long.

The sole of each strip is then welded ultrasonically using apparatus with a frequency of 36 kHz marketed by the company TELSONIC, onto a shaving head of a disposable razor made of polystyrene, near the cutting blade.

Example 2

In order to check the robustness of the ultrasonic weld, comparative tests were performed.

There were prepared:

on the one hand, 20 anti-friction strips (A) by extruding a blend containing 30 g of polystyrene and 70 g of polyoxyethylene with a molecular mass in excess of 5,000,000 marketed under the name PEG 115M. These strips have the following dimensions:

| | |
|---|---|
| width: | 3.5 mm |
| length: | 35 mm |
| height: | 0.8 mm | and, on the other hand, 20 anti-friction strips (B) secured to a sole and prepared in accordance with Example 1.

Each strip was ultrasonically welded onto a shaving head of a disposable razor made of polystyrene as in Example 1.

Figure 3:
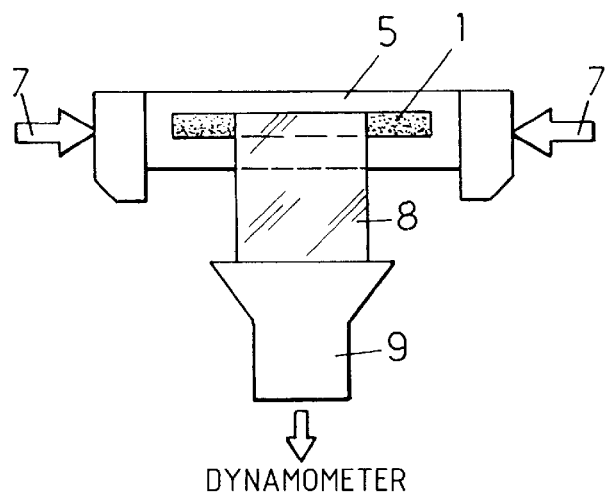
FIG. 3 depicts the device used in example 2 for evaluating the quality of the weld.

Using the device depicted in FIG. 3, the robustness of the ultrasonic weld was measured as follows:

The razor head (5) was held by its two ends in a clamping system (7).

An adhesive tape (8), 25 mm wide, was fixed at right angles to the length of the strip ultrasonically welded onto the razor head. Using a crocodile clip (9) connected to a tensile testing machine, tension was exerted on the adhesive tape so as to tear the strip off. The force exerted in order to tear this strip off was measured, and results obtained are given in table 1 below.

TABLE 1

| Strip A | 1 | 2 | 3 | 4 | 5 | 6 | 7 | 8 | 9 | 10 |
|---|---|---|---|---|---|---|---|---|---|---|
| Force exerted (in N) | 2 | 5 | 1 | 1 | 2 | 1 | 4 | 1 | 2 | 1 |
| Strip B | 1 | 2 | 3 | 4 | 5 | 6 | 7 | 8 | 9 | 10 |
| Force exerted (in N) | 20 | 20 | 19 | 20 | 19 | 20 | 20 | 20 | 20 | 20 |
| Strip A | 11 | 12 | 13 | 14 | 15 | 16 | 17 | 18 | 19 | 20 |
| Force exerted (in N) | 2 | 2 | 2 | 1 | 3 | 5 | 1 | 4 | 2 | 5 |
| Strip B | 11 | 12 | 13 | 14 | 15 | 16 | 17 | 18 | 19 | 20 |
| Force exerted (in N) | 20 | 20 | 19 | 20 | 20 | 20 | 19 | 20 | 20 | 20 |

It is evident from these comparative tests that the welds of coextruded strips (B) resist tearing-off far better than the strips according to the prior art (A), the force needed to tear them off being far higher in the case of the strips (B). Furthermore, this higher force allows the upper layer intended to come into contact with the skin during shaving to be torn off the sole but does not allow the sole to be torn off, the latter remaining fixed to the razor head.

Furthermore, the quality of the welds obtained with the strips (B) is far more uniform than the quality of welds obtained with the strips (A), the spread of the results of the tests being far narrower in the case of the strips (B) than in the case of the strips (A)

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A razor head having at least one blade and an anti-friction element arranged near the at least one blade, said anti-friction element comprising:
    an upper layer containing water-soluble agents; and
    a sole of the same composition as said razor head; wherein:
        said anti-friction element is fixed to said razor head by welding of said sole to said razor head;
        said upper layer is attached to said sole by one of molding, coextrusion, overmolding, or twin-shot injection molding; and
        a polymer interface is provided between said sole and said upper layer.

2. The razor head as claimed in claim 1, wherein said sole contains at least one polymer capable of being fixed to said razor head by welding, said polymer being selected from the group consisting of polyethers, polyphenylene-ether, styrene resins, polystyrene, ABS, polyolefin resins, polypropylene, polyethylene, acrylic resins, PMMA, vinyl resins, plasticized polyvinyl dichloride, non-plasticized polyvinyl chloride, and blends thereof.

3. The razor head as claimed in claim 2, wherein said upper layer is intended to come into contact with the skin during shaving and contains a blend of (a) insoluble polymers selected from the group consisting of: polyethers, polyphenylene-ether, styrene resins, polystyrene, ABS, polyolefin resins, polypropylene, polyethylene, acrylic resins, PMMA, vinyl resins, plasticized polyvinyl dichloride, non-plasticized polyvinyl chloride, and blends thereof; and (b) soluble polymers selected from the group consisting of: polyoxyethylenes, polyacrylamides, polysaccharides, and blends thereof.

4. The razor head of claim 1, wherein said sole is fixed to said razor head by ultrasonic welding.

5. The razor head of claim 1, wherein said sole has a thickness of from 0.05 mm to 0.6 mm.

6. The razor head of claim 5, wherein said sole has a thickness of from 0.05 mm to 0.4 mm.

7. The razor head of claim 6, wherein said sole has a thickness of about 0.3 mm.

8. The razor head of claim 1, wherein said upper layer has a thickness of from 0.1 mm to 1.5 mm.

9. The razor head of claim 8, wherein said upper layer has a thickness of from 0.3 mm to 1 mm.

10. The razor head of claim 1, wherein: said upper layer contains from 20% to 60% of an insoluble thermoplastic polymer, and from 20% to 80% of polyoxyethylene with a molecular mass of between 100,000 and 6,000,000; said upper layer is coextruded with a layer of polystyrene constituting said sole; and said sole is ultrasonically welded to said razor head.

11. The razor head as claimed in claim 10, wherein said anti-friction element also contains from 1 to 20% of polyoxyethylene with a molecular mass of below 30,000.

12. A method for setting an anti-friction element onto a razor head having at least one blade, said method comprising: securing an upper layer containing water-soluble agents to a sole of the same composition as the razor head and containing one or more insoluble polymers by molding, coextrusion, overmolding, or twin-shot injection molding to form an anti-friction element; inserting a blend of polymers between said upper layer and said sole as an interface; and welding the sole of the anti-friction element to the razor head near the at least one blade of the razor head.

13. The method of claim 12, wherein the anti-friction element is ultrasonically welded to the razor head.

14. A razor head having at least one blade and an anti-friction element arranged near the at least one blade, said anti-friction element comprising:

an upper layer containing water-soluble agents;
a sole of the same composition as said razor head but a different composition from said upper layer; and
a polymer interface between said sole and said upper layer; wherein:
  said anti-friction element is fixed to said razor head by welding of said sole to said razor head; and
  said upper layer is attached to said sole by one of molding, coextrusion, overmolding, or twin-shot injection molding.

* * * * *